United States Patent [19]
Jones

[11] Patent Number: 6,147,599
[45] Date of Patent: Nov. 14, 2000

[54] DECELERATION WARNING SYSTEM WITH SELF-PURGING PRESSURE CONTROL

[76] Inventor: Jerry Jones, 341 Jean St., Mill Valley, Calif. 94941

[21] Appl. No.: 09/094,167

[22] Filed: Jun. 9, 1998

[51] Int. Cl.[7] ............................................. B60Q 1/26
[52] U.S. Cl. ........................ 340/467; 340/463; 340/479
[58] Field of Search .................................. 340/467, 463, 340/464, 479, 468; 307/10.8; 60/274, 276, 277; 180/197, 103, 271, 169; 188/106 P, 181 A, 181 C, 3 H

[56] References Cited

U.S. PATENT DOCUMENTS

| | | | |
|---|---|---|---|
| 1,859,598 | 5/1932 | North. | |
| 2,250,133 | 7/1941 | Pearce et al. . | |
| 2,296,667 | 9/1942 | Hemphill . | |
| 2,833,880 | 5/1958 | Repkow . | |
| 3,372,372 | 3/1968 | Carpenter et al. | 340/467 |
| 3,639,898 | 2/1972 | Booth | 340/71 |
| 4,149,141 | 4/1979 | Tanimura | 340/464 |
| 4,219,710 | 8/1980 | Booth | 200/81 R |
| 4,418,331 | 11/1983 | Chicoine | 340/467 |
| 4,805,571 | 2/1989 | Humphrey | 123/316 |
| 4,959,634 | 9/1990 | Miller | 340/467 |
| 5,325,663 | 7/1994 | Itoh | 60/274 |
| 5,431,253 | 7/1995 | Hargrove | 188/3 H |
| 5,495,226 | 2/1996 | Vowell | 340/475 |
| 5,532,674 | 7/1996 | Michaud | 340/479 |

*Primary Examiner*—Edward Lefkowitz
*Assistant Examiner*—Davetta W. Goins

[57] ABSTRACT

A deceleration warning system for motor vehicles which uses engine vacuum to operate a warning signal visible to following traffic. Rapid intake duct pressure fluctuations, which can cause malfunction and deterioration of the vacuum switch, are filtered out by a pressure control unit. The pressure control unit allows a vacuum connection to the intake duct for one cylinder, most conveniently by means of a fitting that screws into a throttle synchronizing port.

Fuel vapor, which can enter an intake vacuum system and condense therein, is continually purged while the engine is operating. This purging action allows the vacuum switch to be mounted below the intake duct without the danger of fuel accumulating in the system.

7 Claims, 8 Drawing Sheets

DECELERATION WARNING SYSTEM WITH SELF-PURGING PRESSURE CONTROL

BACKGROUND

1. Field of Invention

This invention is an improved deceleration warning system for motor vehicles, especially motorcycles.

2. Discussion of Prior Art

A deceleration warning signal activated by closing the throttle of a motor vehicle provides an increased margin of safety by alerting following traffic to the fact that a vehicle is beginning to slow down, often well before the application of the brakes illuminate the brake light. Generally, three classes of device have been proposed to perform this function: switches directly connected to the throttle linkage, inertial switches, and switches controlled by intake manifold vacuum.

Switches connected to the throttle linkage would need to close when the throttle is at an idle-speed position in order to be effective in low speed traffic. However, when the vehicle is travelling at high speed, even a partial closing of the throttle can result in considerable deceleration without activating the switch, thereby failing to signal a warning to following traffic.

Inertial switches such as pendulum switches or mercury switches are simple and reliable, but in this application can only work on a level road. Climbing or descending a hill would bias the switch toward an always open or always closed state.

Vacuum switch deceleration indicators are activated by the partial vacuum created in the intake passage or manifold when the throttle valve restricts the air flow into the combustion chamber on the intake stroke of the piston. The resulting pressure differential between the combustion chamber and the crankcase, acting on the piston, produces a retarding force on the engine and the vehicle. This process is commonly referred to as "engine braking".

PRIOR ART

A vacuum switch connected to the intake manifold and used to actuate a deceleration warning light was patented by Charles H. North in 1932 (U.S. Pat. No. 1,859,598).

Pearce and Karibo were granted U.S. Pat. No. 2,250,133 in 1941 for a vacuum actuated switch controlling a green and yellow light at the rear of the vehicle in addition to the normal red brake light. When the vehicle is accelerating or running at a steady speed, with slight manifold vacuum, the green light is illuminated. When decelerating, with a stronger manifold vacuum, the yellow light is lit. Some embodiments incorporate a restricted passageway between the chambers on each side of the diaphragm in order to allow for the equalization of pressure after a certain time, presumably to prevent a condition where a steady speed with a small throttle opening would continuously illuminate the yellow light.

In 1942 Thomas Nelson Hemphill was awarded U.S. Pat. No. 2,296,667 for a device similar to that of North, further incorporating an electromagnetic interrupter, or flasher unit to produce a flickering brake light illumination. When the brake was operated, the brake light switch shunted electric current around the flasher, replacing the flashing light with a steady illumination.

In 1958 George W. Repkow received U.S. Pat. No. 2,833,880 for an invention quite like that of Pearce and Karibo, using an adjustable vacuum switch, but with a similar air bleed orfice which allows the pressure on each side of the vacuum switch diaphragm to equalize, thus limiting the time that the switch remains closed. Repkow claimed that when closing the throttle at higher speeds, the pressure differential would be greater, and the warning signal would stay on longer than at slow speeds. Repkow's device uses a single red light signal like those of Hemphill and North. The vacuum switch circuit incorporates a resistor which makes the warning light dimmer than when it is overridden by the brake switch circuit.

One problem with limiting the duration of the warning signal is that in descending a long hill or mountain road, where engine braking is often employed to limit the speed of the vehicle without overheating the brakes, the warning light would be useless after the pressure on each side of the diaphragm equalized.

W. R. Carpenter, et al. were granted U.S. Pat. No. 3,372,372 in 1968 for an adjustable vacuum switch with a "floating" contact washer claimed to reduce electrical burning and pitting. The switch controls a warning light separate from the brake light through a circuit which allows a small current to flow through the deceleration warning light in order to preheat the filament, presumably increasing its operating life.

U.S. Pat. No. 3,639,898, to Robert G. Booth, 1972, illuminates a deceleration light by means of a vacuum switch incorporating a ball-shaped piston which maintains a spring contact switch in the open position until it is raised within its cylindrical tube by manifold vacuum, thereby closing the switch. A permeable diaphragm valve above the ball isolates the ball from being influenced by the vacuum until the vacuum reaches a preset level. There is a time delay before the ball returns to its original position, opening the switch.

U.S. Pat. No. 4,219,710, also to Booth, 1980, is an improvement to the above switch, allowing adjustment of the set point.

It would seem that Booth's design is more susceptible to sticking than a diaphragm switch, and more affected by inertial forces which would cause the ball to bounce on the spring contact, leading to unnecessary flashing of the warning signal under bumpy road conditions.

U.S. Pat. No. 4,959,634 (Ronald L. Miller, 1990) actuates a warning signal using a combination of manifold vacuum sensing, vehicle speed sensing, brake application, and inertial deceleration sensing.

Dennis W. Vowell received U.S. Pat. No. 5,495,226, February 1996, for a simple, adjustable vacuum switch which is connected to the brake light and functions much like the North device of 1937, and can be set to close at idle-speed vacuum levels, thereby illuminating the brake light not only when decelerating, but also when the vehicle is stopped with the engine running.

Note that all these vacuum switch devices are connected to the engine intake manifold or to the vehicle vacuum system, which is connected to the intake manifold. The vacuum system includes other vacuum-operated devices such as brake boosters, spark advance mechanisms, and in older cars, windshield wiper motors. The manifold of a multicylinder engine provides a fairly smooth curve of pressure variation with varying engine conditions. This smoothing effect is the result of two factors: one—the intake stroke of each cylinder occurs at a different point in the rotation cycle, thus, with four or more cylinders and normal valve timing, at least one intake valve will be partially open at any time; and two—because the intake manifold acts as a plenum where the elasticity of the contained gas tends to smooth any rapid pressure fluctuations.

Old Designs Unsuitable for Modern Motorcycle Engines

Modern high performance engines, however, no longer use intake manifolds, but rather a separate equal-length duct leading from the airbox to each cylinder, with each cylinder provided with its own throttle valve. The length and cross-section of the ducts is designed to set up resonant pressure waves at certain engine speeds which can increase power through improved engine breathing. Clearly, there is considerable pressure variation within each duct from one intake stroke to the next.

If a vacuum switch is connected to an intake duct, this cyclic pressure variation will cause the switch to cycle at a corresponding frequency, depending on the mass, elasticity and internal friction characteristics of the switch. This rapid cycling action not only causes premature destruction of the switch contacts, but at certain engine speeds can set up standing wave resonances in the switch spring and/or diaphragm which have been found to produce erratic and unpredictable switch response.

Condensation Problem

A second problem in adapting these designs to modern engine configurations is caused by condensation of fuel in the vacuum system. Older car designs allowed the vacuum switch to be mounted high on the firewall, or in some other location above the intake manifold, so that fuel condensing in the system could drain back into the manifold. Modern high performance vehicles with low hood lines, overhead camshafts and large-capacity airboxes have limited space above the intake ducts. There is even less space on a motorcycle, where the steering head, frame spars, fuel tank and airbox are all crowded together. Another drawback is that the high temperatures in these environments can shorten the service life of switch diaphragms.

Mounting the vacuum switch below the intake ducts, however, leads to a buildup of condensed fuel vapor in both in the tubing and in the switch itself. This liquid fuel changes the response characteristics of the switch, a result of increased mass and fluid friction. The mass of the liquid will change the set point, and the friction will change the response time.

A more serious problem is that the fuel, especially today's oxygenated fuel, will tend to erode the membrane or other elastic seals that separate the pneumatic from the electrical elements of the switch. This could lead to a fire or an explosion if arcing occurs at the switch contacts. A ball-piston switch as described in the Booth patents uses a permeable membrane in a chamber which would fill with condensed fuel if mounted below the manifold as shown in Booth's FIG. 2. If the vehicle then stood with the engine off for a time, the fuel could pass through the membrane and into the cylinder, past the loosely-fitted ball, and soak into the filter material at the bottom of the chamber, ready to ignite when the switch is next activated.

Objects and Advantages

Accordingly, several objects and advantages of my invention are as follows:

To provide a simple and reliable vacuum switch deceleration signal which can be readily mounted to modern high-performance vehicles in a convenient location away from heat and vibration.

To allow the switch to be connected to a single intake duct and yet avoid the destructive cycling, as well as the erratic response which rapid pressure variations in the intake duct can cause.

To continually purge the system of fuel vapor and condensate, thus eliminating poor switch performance, diaphragm erosion, and the consequent risk of fire or explosion.

To enable the deceleration signal system to be connected to an intake duct without the necessity of drilling or removing the duct.

To provide an indicator lamp visible from the vehicle operator's position in order to verify the proper operation of the switch.

Further objects and advantages of my invention will become apparent from a consideration of the drawings and ensuing description.

Figure 1:
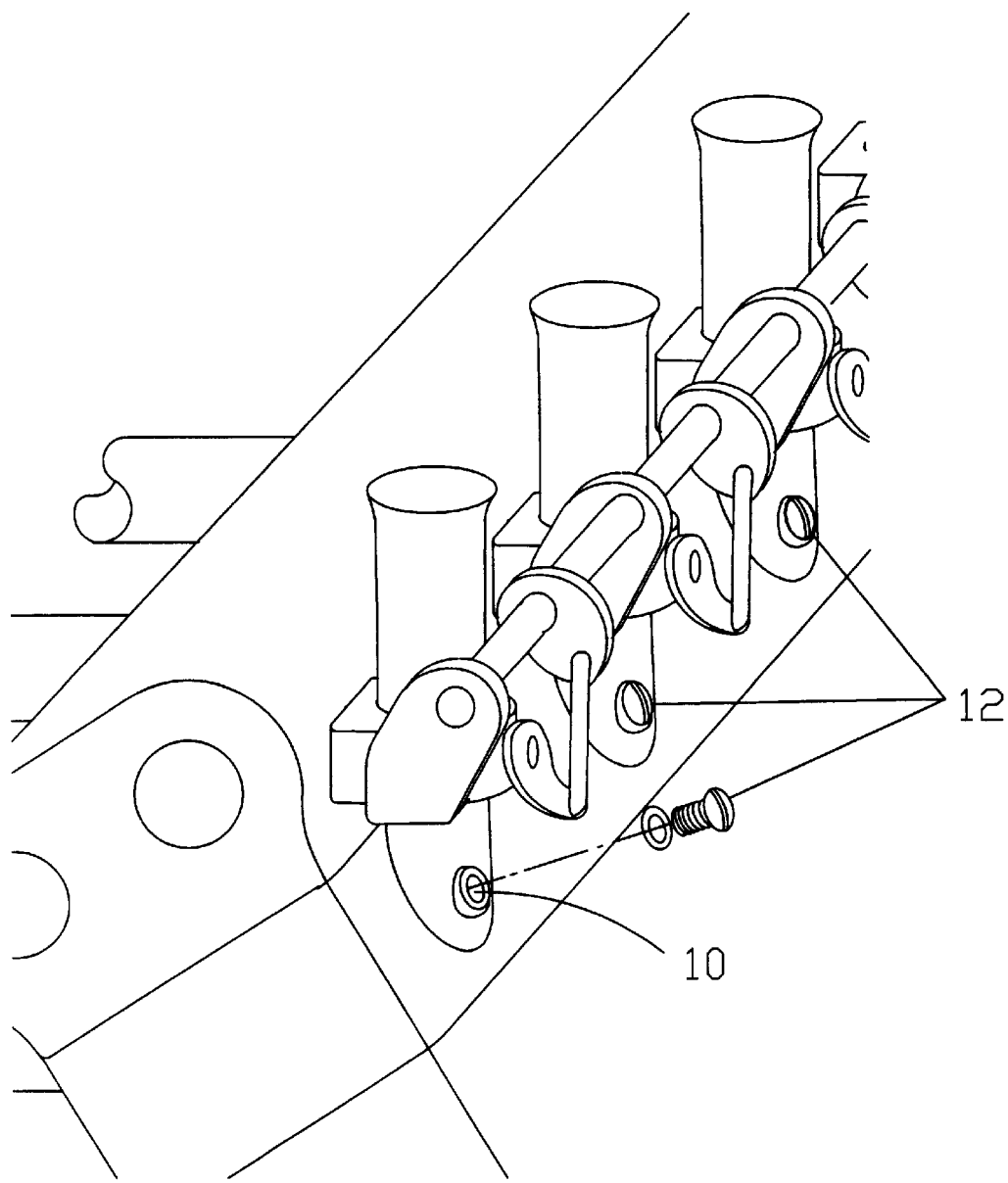
FIG. 1 is a detail of the intake system of a multicylinder engine.

| Reference Numerals In Drawings | |
|---|---|
| 10 synchronizing port | 12 screw |
| 14 adapter nipple | 16 threaded end |
| 18 pressure control unit | 20 flexible tube |
| 22 flow restrictor disc | 24 flow restrictor orfice |
| 26 purge air inlet | 28 housing |
| 30 air filter | 32 plenum |
| 34 threaded orfice | 36 threaded nipple |
| 38 electric leads | 40 ball |
| 42 ball seat | 44 spring |

SUMMARY

The DECELERATION WARNING SYSTEM WITH SELF-PURGING PRESSURE CONTROL can be mounted to any internal combustion-powered vehicle so that closing the throttle will activate some sort of warning signal which alerts following traffic to the deceleration of the vehicle even though the brakes have not been applied. The self-purging feature allows the switch to be mounted in any convenient location without condensed fuel vapor accumulating in the switch and interfering with its operation. The vacuum line may be connected to a synchronization port of a multicylinder engine having a throttle valve for each inlet passage. A pressure control unit is designed to eliminate rapid and destructive cycling of the switch which could be caused by momentary pressure fluctuations corresponding to the opening and closing of the intake valve or valves for that particular cylinder.

This device is especially well suited to high performance cars and motorcycles which have separate air inlet passage leading to each cylinder, or sometimes to each intake valve. Air flow through the inlet passage is controlled by a throttle valve, whether in the carburetor or as part of a fuel injection system. Whenever the throttle is closed, the movement of the piston and valves in the engine acts as a vacuum pump, creating a partial vacuum in the inlet passage. High performance multicylinder engines customarily have threaded holes in the inlet passages, which are used to connect one or more vacuum meters when synchronizing the throttle valves. These synchronizing ports are plugged with screws in normal operation. The vacuum switch is connected to a synchronizing port with a flexible hose terminating in a threaded nipple. When the throttle is closed, the normally open switch is closed by the movement of a piston or diaphragm, allowing electrical current to flow to a signalling device such as a light. Modern engine design utilizes downdraft intake flow, which places the inlet passages above the cylinder head. This design makes it difficult, if not impossible to mount the switch above the inlet passage, especially on motorcycles, where the airbox and the fuel tank occupy all available space.

DESCRIPTION

FIG. 1 illustrates part of a multicylinder engine, showing how the throttle synchronizing ports (10) are normally plugged with screws (12).

Figure 2:
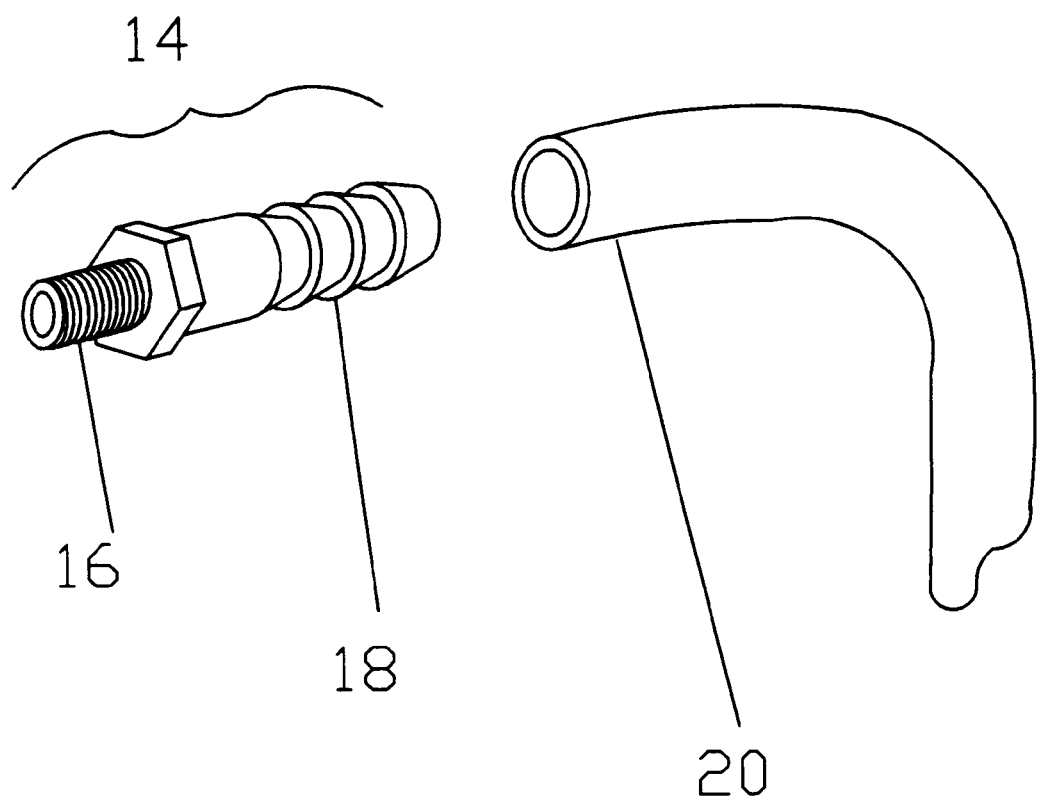
FIG. 2 shows a an adapter nipple and flexible tubing.
Figure 3:
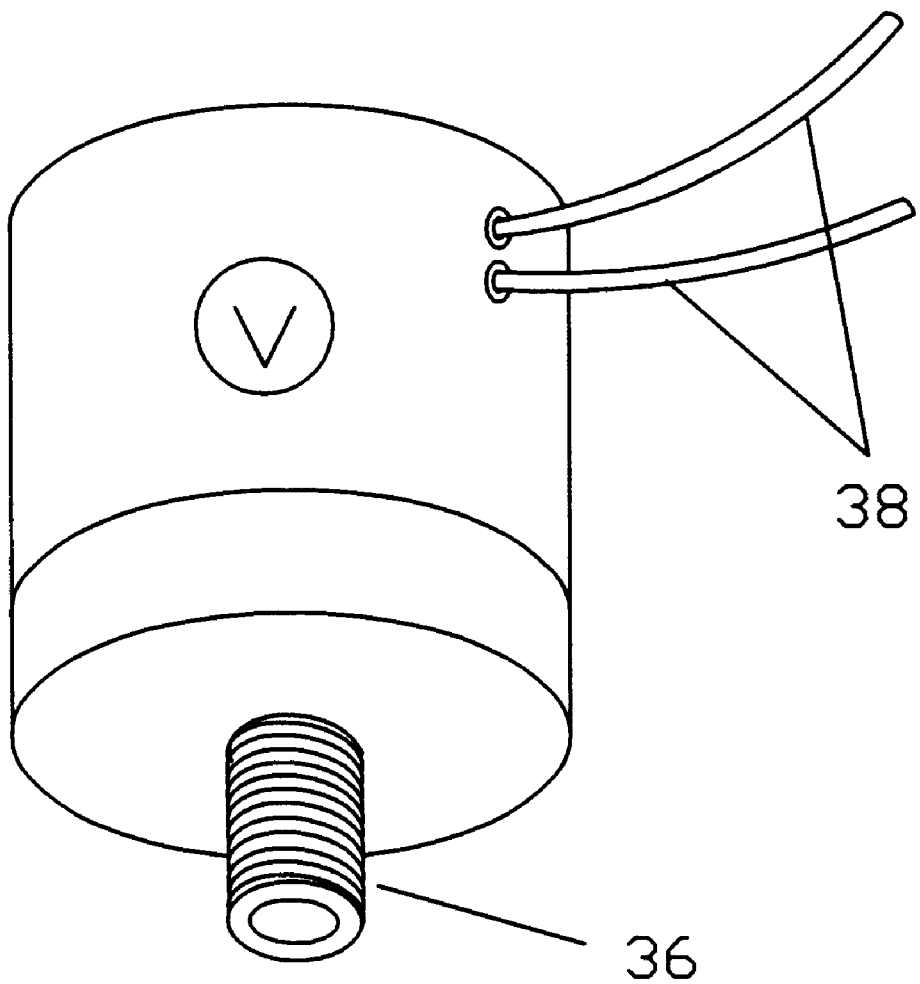
FIG. 3 shows a vacuum switch.
Figure 4:
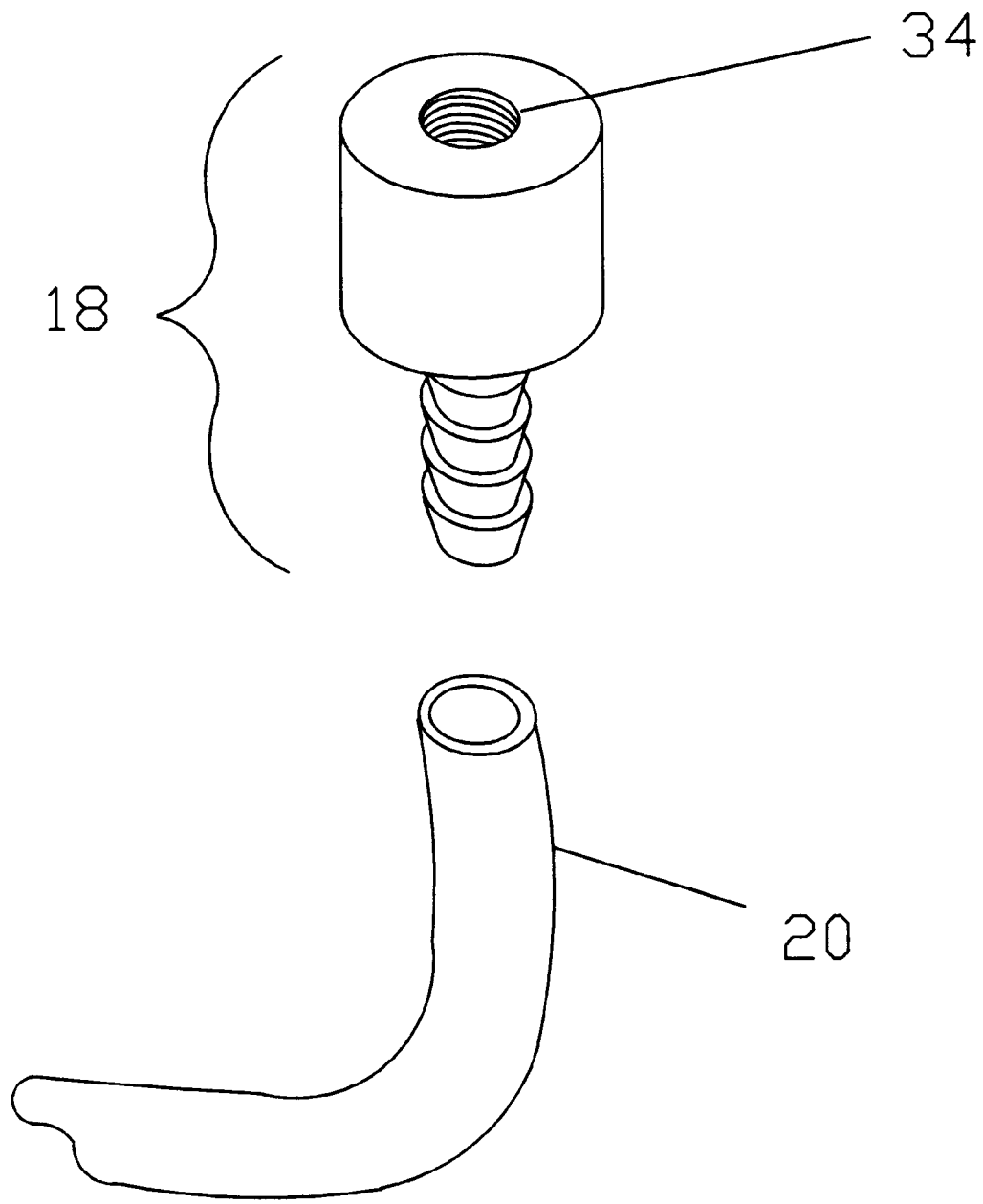
FIG. 4 shows a pressure control unit and flexible tubing.
Figure 5:
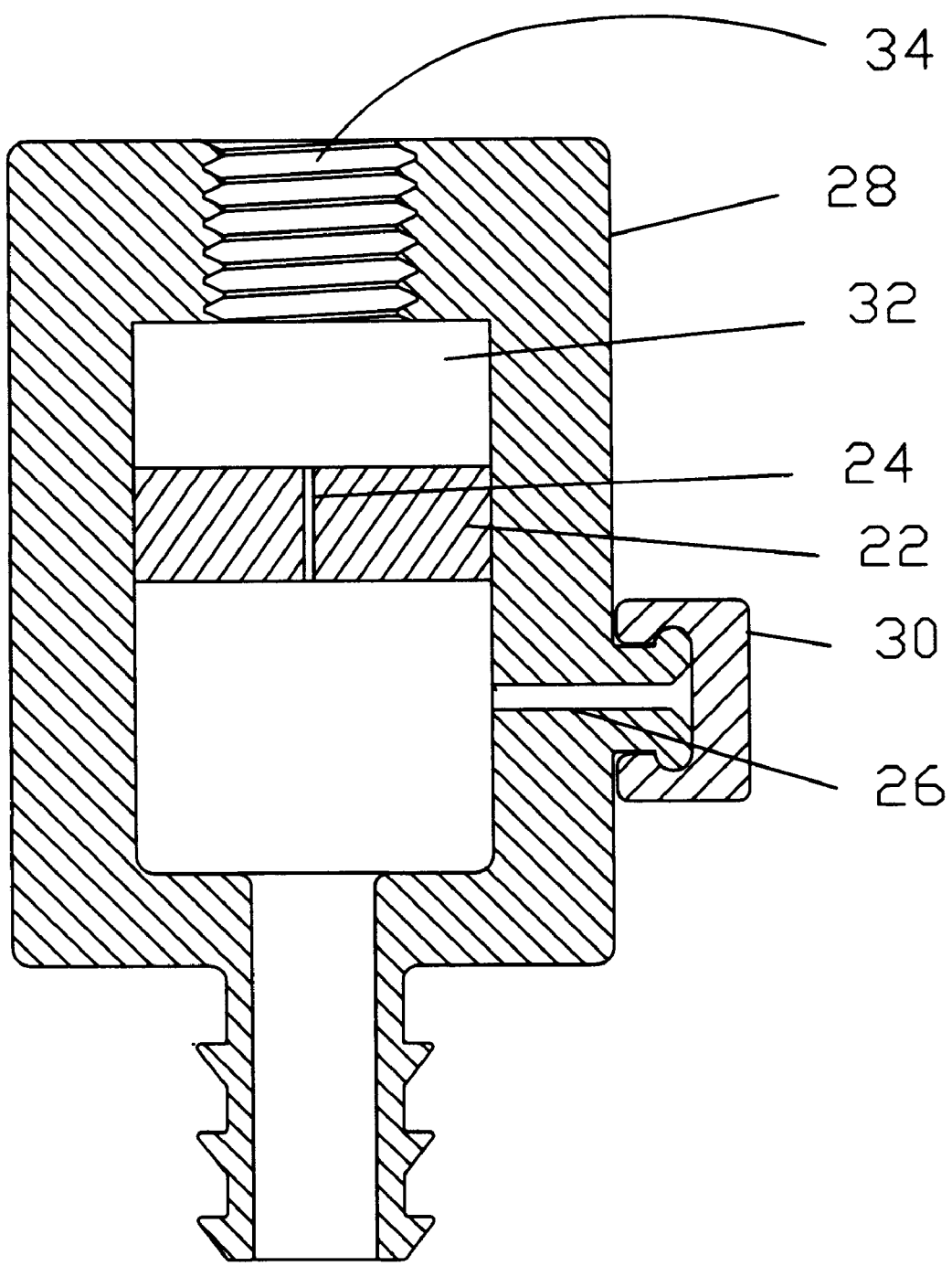
FIG. 5 is a section of a pressure control unit.

FIG. 2 shows an adapter nipple (14) with a threaded end (16) which screws into a synchronizing port (10) or other suitable orfice in the air intake duct between the intake valve and the throttle valve of an internal combustion engine (FIG. 1) having individual intake ducts for each cylinder. A flexible tube (20) connects the barbed end of the nipple to the barbed end of a pressure control unit (18) as shown in FIG. 4. FIG. 5 is a section view of the pressure control unit, showing a flow restrictor disc (22) with a flow restrictor orfice (24). A purge air inlet (26) is formed in one side of the housing (28), which protrudes to accept a flexible, porous air filter (30). An air chamber, or plenum, (32), leads to a threaded orfice (34) at the top, which is screwed onto the threaded nipple (36) of a vacuum switch which is marked with a circled V in FIG. 3. Two electric leads (38) connect the switch to the vehicle wiring system as shown schematically in FIGS. 6 and 6A.

Figure 5A:
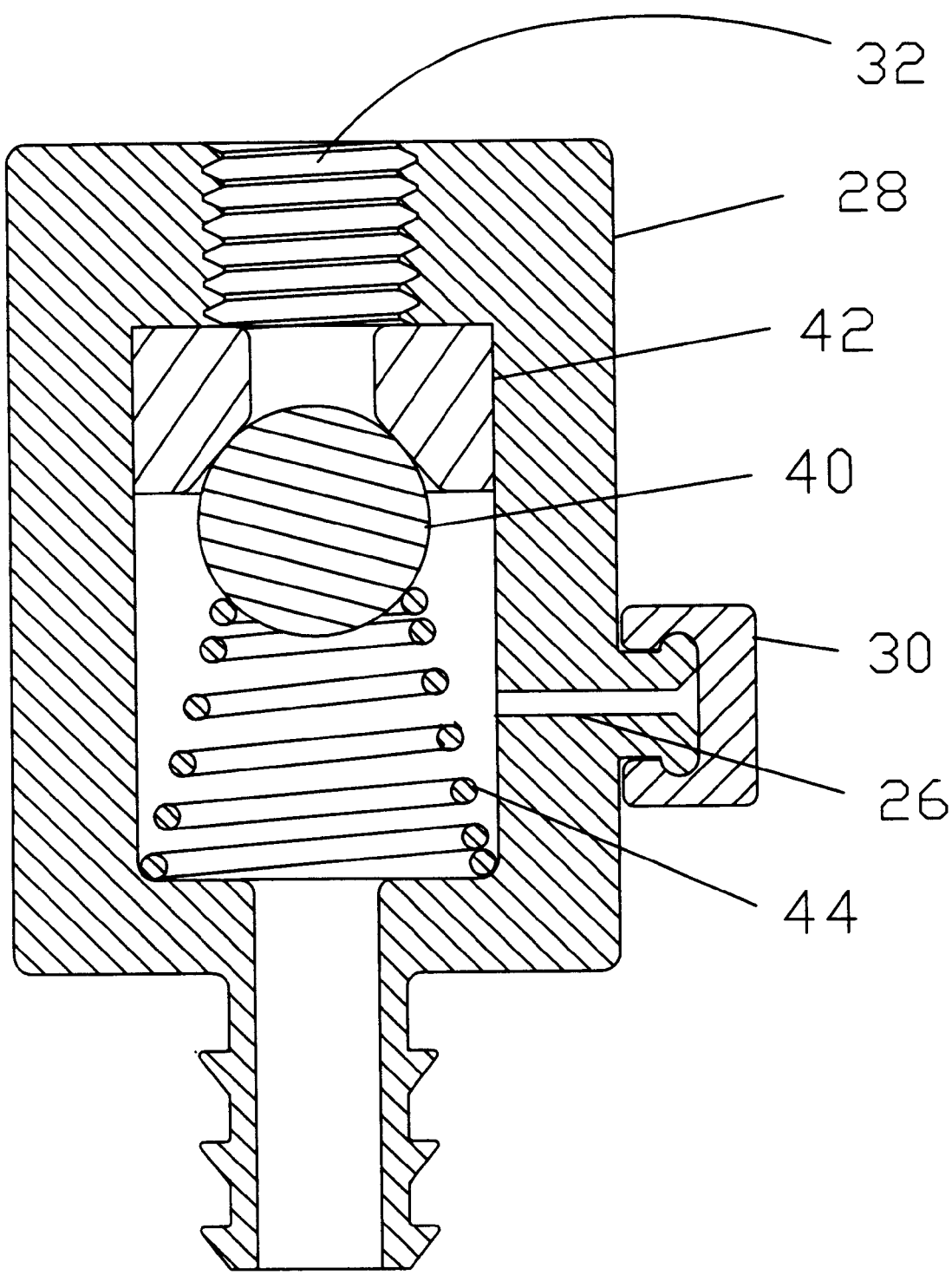
FIG. 5A is a section of a pressure control unit.

A second embodiment uses a different pressure control unit as shown in section in FIG. 5A, where the flow restrictor disc is replaced by a check valve. A lightweight ball (40) is held against a porous ball seat (42) by a spring (44).

Operation

When the throttle of a moving vehicle is closed, the engine acts as a vacuum pump, reducing the pressure in the intake duct between the between the throttle valve and the engine intake valve relative to atmospheric pressure. Whenever intake duct pressure is reduced significantly, indicating vehicle deceleration or engine braking, the normally open vacuum switch (V) which is pneumatically connected to the intake duct, will close, electrically activating a deceleration warning signal visible to following traffic.

The set point of the vacuum switch may be preset to close at an appropriate pressure differential, whether this is only when the vehicle is decelerating, or also when the vehicle is stopped with the engine idling.

In order to prevent the cyclic pressure fluctuations in the intake duct from causing the vacuum switch to malfunction, a pressure control unit (18) is used to smooth pressure variations.

The pressure control unit in FIG. 5 uses a flow restriction orfice (24), which slows air flow in and out of the plenum (32). Any rapid pressure variations in the intake duct are transmitted slowly through the orfice and absorbed by the elasticity of the air volume in the plenum, thus filtering out all but the slower pressure changes, which correspond to changes of throttle position.

It has been found that the degree of flow restriction and the plenum capacity needed also slows the switch response by about one half second. While this is not a significant delay in most driving situations, it might be desirable to virtually eliminate response delay by bypassing the flow restrictor using a one way valve, or check valve.

A check valve will allow air to be readily drawn out of the vacuum switch, yet still prevent rapid cycling by restricting the return of air into the vacuum switch. A second embodiment of the pressure control unit is shown in FIG. 5A.

Here, whenever pressure in the inlet duct is reduced below atmospheric pressure by a predetermined amount, atmospheric pressure in the switch housing forces the ball (40) away from its seat (42), permitting air to pass between the ball and the seat and thereby drawing air from the switch air inlet and closing the switch contacts. This embodiment, rather than transmitting average pressure to the vacuum switch, smoothes the pressure fluctuations by transmitting only the lowest pressure component of the intake pressure variation cycle at any given engine speed and throttle position.

The ball seat (42) is porous in order that higher pressure air can be re-enter the switch when the throttle is opened and the engine intake duct pressure again approaches atmospheric pressure. The porous ball seat acts like the flow restrictor in FIG. 5, and will delay the opening of the vacuum switch, which will leave the warning signal switched on briefly after the throttle is reopened. This delay is inconsequential.

The purge air inlet (26) in both versions of the flow control module is sized to pass just enough air through the flexible tubing to transport any fuel or fuel vapor in the tube back to the engine intake duct without significantly increasing air pressure reaching the vacuum switch or affecting the fuel mixture reaching the combustion chamber. An air filter (30) is used to prevent small particles from reaching the engine or clogging the purge air inlet.

Figure 6:
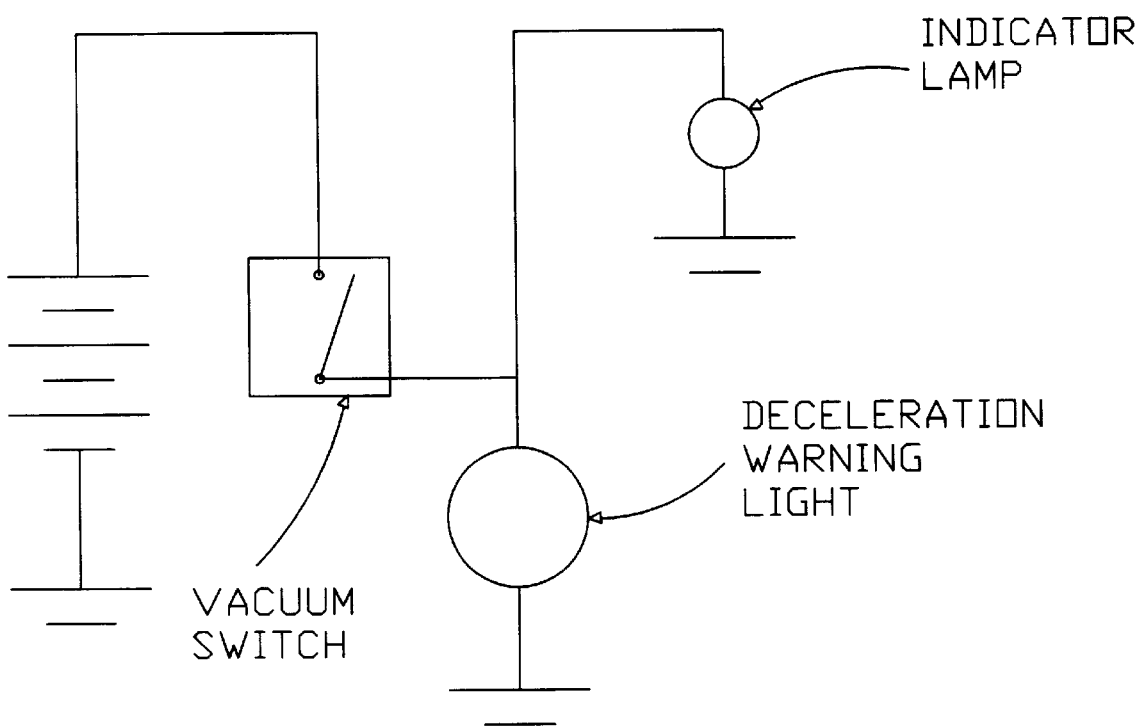
FIG. 6 is a wiring schematic diagram.
Figure 6A:
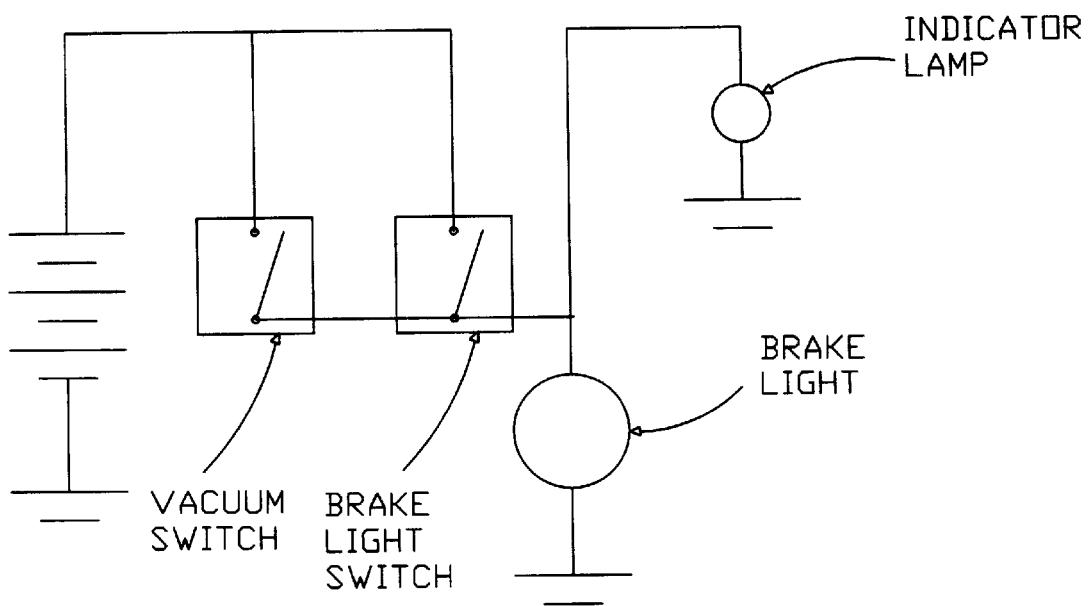
FIG. 6A is a wiring schematic diagram.

In FIG. 6, it is apparent that closing the vacuum switch will illuminate a deceleration warning light, as well as an indicator light which serves to confirm the switch operation to the vehicle operator. In FIG. 6A, the vehicle brake light is illuminated either by the vacuum switch or by the brake light switch, or by both.

Conclusion, Ramifications, and Scope

It should be emphasized that although the DECELERATION WARNING SYSTEM WITH SELF-PURGING PRESSURE CONTROL described above contains specific embodiments, these should not be construed as limitations on the scope of the invention, rather as exemplifications serving to clarify the underlying concept. Many other variations are possible, especially variations of the check valve design, which could consist of a disc valve, flapper valve, reed valve, diaphragm valve or other design commonly used to ensure a unidirectional fluid or gas flow. Accordingly, the scope of the invention should be determined not by the embodiments illustrated, but by the appended claims and their legal equivalents.

There are many signalling options available also, some of which are described in the prior art; since these are not the subject of this patent I have not elaborated on them. Similarly, there are many designs for vacuum switches; but the vacuum switch is only a generic element of this deceleration warning system.

I claim:

1. A vacuum-operated deceleration warning device for motor vehicles comprising:
   (a) a normally open vacuum switch electrically connected to a signal light at the rear of the vehicle
   (b) a pneumatic connector between said vacuum switch and an engine intake duct, whereby a reduction in engine intake duct pressure due to throttle closure will close said switch and signal a reduction in vehicle speed to following traffic without application of the brakes (c) pressure stabilizing means to reduce high frequency pressure variations at said vacuum switch caused by the rapid opening and closing of an engine intake valve which continuously interrupts the airflow in said intake duct, whereby said vacuum switch is protected from high frequency cycling which can cause both inaccurate response and rapid wear.

2. The device of claim 1 wherein pressure stabilization is achieved by airflow restriction means whereby said vacuum switch is subject to pressure substantially corresponding to an average of high frequency intake duct pressure variations.

3. The device of claim 1 wherein pressure stabilization is achieved using a check valve and a restricted return passage located so that airflow away from said vacuum switch is permitted, but airflow toward the vacuum switch is restricted, whereby said vacuum switch is subject to pressure substantially corresponding to the lowest value of high frequency intake duct pressure variations.

4. The device of claim 1 further including purging means whereby fuel vapor is returned to the intake duct, thereby protecting the device from exposure to corrosive chemicals and possible combustion.

5. The device of claim 4 wherein an orifice of predetermined size forces a flow of air into said pneumatic connection by the pressure differential between said intake duct and the atmosphere, thereby displacing fuel vapor from said connector into said intake duct.

6. The device of claim 5 further including air filtration means whereby particles which may clog said orifice are excluded.

7. The device of claim 1 wherein said pneumatic connector includes a threaded fitting which may be screwed into a single synchronizing port of a multicylinder engine, thereby simplifying installation of the Deceleration Warning System.

* * * * *